US007275181B2

(12) United States Patent
Staiger

(10) Patent No.: US 7,275,181 B2
(45) Date of Patent: Sep. 25, 2007

(54) AUTONOMIC EMBEDDED COMPUTING "DYNAMIC STORAGE SUBSYSTEM MORPHING"

(75) Inventor: Dieter Staiger, Weil im Schoenbuch (DE)

(73) Assignee: International Business Machines Corporation, Armonk, NY (US)

( * ) Notice: Subject to any disclaimer, the term of this patent is extended or adjusted under 35 U.S.C. 154(b) by 547 days.

(21) Appl. No.: 10/801,203

(22) Filed: Mar. 16, 2004

(65) Prior Publication Data

US 2004/0205386 A1 Oct. 14, 2004

(30) Foreign Application Priority Data

Mar. 26, 2003 (EP) ................................ 03100780

(51) Int. Cl.
*G06F 11/00* (2006.01)

(52) U.S. Cl. ............................ 714/13; 714/6; 714/11; 714/12; 714/702; 701/33; 701/36; 701/39; 700/4; 700/5; 711/153

(58) Field of Classification Search .................... 714/6, 714/11-13, 702; 701/33, 36, 39; 700/4, 700/5; 711/153
See application file for complete search history.

(56) References Cited

U.S. PATENT DOCUMENTS

| | | | | |
|---|---|---|---|---|
| 5,495,570 | A * | 2/1996 | Heugel et al. | 714/11 |
| 5,957,985 | A * | 9/1999 | Wong et al. | 701/33 |
| 6,463,373 | B2 * | 10/2002 | Suganuma et al. | 701/48 |
| 6,981,176 | B2 * | 12/2005 | Fruehling et al. | 714/11 |
| 2001/0041956 | A1 * | 11/2001 | Wong et al. | 701/36 |

* cited by examiner

*Primary Examiner*—Robert Beausoliel
*Assistant Examiner*—Charles Ehne
(74) *Attorney, Agent, or Firm*—Duke W. Yee; A. Bruce Clay; Brandon G. Williams

(57) ABSTRACT

A Dynamic Storage Subsystem Morphing (DSSM) mechanism (40) is connected to a plurality of storage subsystem resources, which reserve some storage area each non-donor ECU (12), ready for a "slot-down/up" access by a respective non-donor ECU having a storage subsystem (24) breakdown. The slot-down process enables the use of a high physical address range by the non-donor processor provided with addressing capabilities sufficient only for addressing lower ranges.

13 Claims, 10 Drawing Sheets

LSB

| | | | | | | |
|---|---|---|---|---|---|---|
| 0 | 1 | 1 | 1 | F | LSB | 0 |
| 1 | 2 | 1 | 2 | | | |
| 2 | 4 | 1 | 4 | | | |
| 3 | 8 | 1 | 8 | | | |
| 4 | 16 | 1 | 16 | F | | 0 |
| 5 | 32 | 1 | 32 | | | |
| 6 | 64 | 1 | 64 | | | |
| 7 | 128 | 1 | 128 | | | |
| 8 | 256 | 1 | 256 | F | | 0 |
| 9 | 512 | 1 | 512 | | | |
| 10 | 1.024 | 1 | 1024 | | | |
| 11 | 2.048 | 1 | 2048 | | | |
| 12 | 4.096 | 1 | 4096 | F | | 0 |
| 13 | 8.192 | 1 | 8192 | | | |
| 14 | 16.384 | 1 | 16384 | | | |
| 15 | 32.768 | 1 | 32768 | | | |
| 16 | 65.536 | 1 | 65536 | F | | 0 |
| 17 | 131.072 | 1 | 131072 | | | |
| 18 | 262.144 | 1 | 262144 | | | |
| 19 | 524.288 | 1 | 524288 | | | |
| 20 | 1.048.576 | 1 | 1048576 | 9 | | 6 |
| 21 | 2.097.152 | 0 | 0 | | | |
| 22 | 4.194.304 | 0 | 0 | | | |
| 23 | 8.388.608 | 1 | 8388608 | | MSB | |
| | | | | | | |
| 24 | 16.777.216 | | | | | MSB |
| | | | 10.485.759 | 9FFFFF | | 600000 |
| | | | | | | |
| | | | PB-1 address room | | | |

ADDRESS COMPLEMENT PB2 ADDRESS ROOM

FIG. 4

AUTONOMIC EMBEDDED COMPUTING "DYNAMIC STORAGE SUBSYSTEM MORPHING"

TECHNICAL FIELD OF THE INVENTION

The present invention relates to the field of embedded processing systems and to autonomic embedded computing solutions, and in particular to embedded processing system covering a plurality of technical applications, the operative functions of which are performed with a respective plurality of application-specific Electronic Control Units (ECU) applying general loosely coupled multiprocessing.

BACKGROUND OF THE INVENTION

The typical application fields of embedded processing systems and Electronic Control Units (ECUs) covered by the proposed invention is covering the major embedded systems market segments:

1. Automotive ECUs, Multi-Media Units, Telematics-Units
2. Industrial Control Units (machinery tool control, manufacturing-line control units)
3. Home-Appliance Electronic Control Units
4. Commercial and Industrial Diagnostics Equipment tools.

The term "embedded system" is to be understood as any computing system or computing device that performs at least one dedicated function or is designed for use with a specific software application, which forms part of any larger technical context "embedding" or surrounding said system, i.e., any technical unit, technical device, technical system, technical plant, as e.g. a car, an aircraft, an undustrial production line, etc. As the electronic systems built-in (embedded) into modern automobiles are characterized by significant rates of growth, the present invention is of significant value of this emerging market, directs a specific focus thereto, and is defined from prior art of this application field next below.

In the most recent years, the embedded electronics of automobiles increased dramatically. Due to this increase of the relevance of the embedded electronics of modern automobiles, the invention is advantageous to this industry sector. The aggregated value of electronics installed in today's high-end vehicle is already representing a value of 20% to 30% of the entire vehicle. This change in the 'nature' of today's automobiles is encountering various consequences.

Previously—typical to the mechanical nature of automobiles—the potential vehicle defects were normally dominated by mechanical wear out and associated malfunctions. Due to the described increase of electronics complexity and electronic component volume—the nature of vehicle failures is changing. As documented in vehicle breakdown statistics, the vehicle defects throughout the vehicle lifecycle is already dominated by electronic system failures.

Thus, in order to meet future requirements of this industry sector, the general requirements particularly relevant for future automotive embedded systems are the following:

1. Improved electronics reliability,
2. Cost effectiveness of the electronic components,
3. Fault tolerance for all safety related electronic systems and mechanical systems,
4. Autonomic system behavior for the major vehicle electronic subsystems,
5. Advanced diagnostic and maintenance capabilities,
6. System 'upgrade' and EC change capability (embedded software and firmware update).

Before discussing the disadvantages of prior art vehicle embedded systems, their basic structure and function will be described with reference to FIGS. 1 and 2 next below.

Prior art embedded automotive systems comprise a communication ECU 10 connecting the vehicle to external systems (WAN) via an interface to a wireless network, like GSM. Further, a plurality of real-time ECUs 12, 14, 16 is provided, each ECU being dedicated to perform a specific functionality in the vehicle. Examples are open/closing the doors, the windows, controlling the light, etc. They have specific I/O subsystems connecting to a variety of real-time buses 13, like CAN1, CAN2, CAN3, VAN, J1850, and the like. Further, a multimedia (MM) ECU 18 is provided, offering the human/machine-interface (HMI) and thus audio, video (multimedia, abbreviated herein as MM) capabilities to people using the vehicle. The multimedia ECU head unit 18 is thus provided with a specific multimedia supporting I/O bus 19, e.g. a MOST bus. The functional elements of the communication ECU 10, real-time ECU 12 and multimedia head unit 18, being in a respective broken line frame are often combined in prior art to a single functional unit, further called in here "automotive telematics ECU". The before-mentioned single ECUs are connected via an inter-ECU-bus having reference sign 11.

With further reference to FIG. 2 the before-mentioned automotive telematics ECU is described in more detail.

The real-time ECU 12 comprises a real-time processor (CPU (1)) 20, connected to a respective storage subsystem 24 and to a specific I/O subsystem 26 connecting to various sensor devices, and to the before-mentioned real-time bus, e.g. CAN, 13. An instruction sequence is processed in a processing branch 1, ie a processing element or processing subsystem having reference sign 22.

The before-mentioned multimedia ECU 18 comprises a respective, high performing main processor (CPU (2)) 28, connected to a respective storage subsystem 32 and to respective I/O subsystems 34 for providing multicolour display, voice driven system input, etc. The multimedia ECU is connected to the multimedia bus 19. Both ECU functions 12 and 18 are provided within a single housing, which plays, however, a minor role in the context of the present invention.

It should be noted that the real-time processor 20, herein referred to also as CPU (1), has less performance but should be able to quickly handle any necessary interrupts, and the storage subsystem 24 of the real-time ECU is considerably smaller than that of the multimedia ECU 18, for example 512 KB in relation to 64 MB. The two internal processing branches cooperate in a loosely coupled multiprocessing way. The typical functional services of processing branch 1, reference sign 22, are real-time related. Functions like unlock the vehicle-doors, start the engine, control the lights, etc. are processed. Typically, this processing branch requires a performance equivalent of 20 MIPS and a storage footprint of 500 KB. The processing branch 2, reference sign 30 is run by a respective high-performing multimedia processor 28—also referred to herein as main CPU(2)—representing the main processing system of the multimedia ECU 18, and is provided with the major processing performance and a respective large system storage, as mentioned above. Typical functions of the main multimedia processor are, for example, driver authentication, driver speech recognition, HMI facility in the field of audio, video and haptic capabilities.

A system fault handler 36 of the prior art system monitors the functionality of the components described above and detects error status situations of single functional units. If an error status is detected, the fault handler 36 switches to a redundantly provided "shadow system", depicted with reference sign 39, which continues operation after a respective reboot procedure.

In case of a CPU failure, the entire processing-branch related functionality will be lost, and in case of a storage subsystem failure, the entire processing-branch-related functionality will be lost.

Typical solutions to provide fault tolerance and increased reliability are typically realized applying massive redundant systems and subsystems. The drawbacks of this redundancy are:

high system costs, increased physical dimensions in size and mass, increased power dissipation, increased electronic volume—and therefore increased potential for subsequent failures.

It is thus an objective of the present invention to provide an improved embedded system and a method to operate it, which requires less redundant components.

SUMMARY OF THE INVENTION

In order to avoid high costs for providing increased system reliability and robustness against any type of runtime problems by redundant resources, it is basically proposed according to the present invention to:

a) operate a preselected one of said ECUs as a "donor" ECU being provided with predefined storage subsystem resources, and b) in case of a breakdown of a storage subsystem and/or processing subsystem of an "non-donor" ECU donating respective predefined resources to said breakdown ECU.

Preferably, this means to select one of said ECUs as a "donor"-ECU, ie an ECU being anyway provided with larger amount of storage area and processing resources, for supporting other non-donor ECUs in case they have a breakdown in their resources. A Dynamic Storage Subsystem Morphing (DSSM) mechanism is implemented connected to said plurality of resources, which reserves some storage area for each non-donor ECU, ready for an inventionally provided "slot-down/slot-up" access by a respective non-donor ECU having a storage subsystem breakdown. Said slot-down process enables the use of an actually high physical address range by the non-donor processor which is basically provided with addressing capabilities sufficient only for addressing lower address ranges.

Advantageously, a split-cycle mode is run, in which the operation cycle of the commonly used memory subsystem is used in an alternating way either by said donor-processor, or by a non-donor processor. In absence of an integrated ASIC architecture a fast FET-switch-based multiplexing mechanism is provided for fast switching between both processors, such that the timing requirements of the processors are achieved.

In case of a non-donor ECU processor breakdown a shared-processor operation mode is proposed, in which the donor-processor takes over the role of the breakdown processor which guarantees for continued operative functions accompanied by some tolerable, minor degradation of functionality of the embedded system. In the automotive field of use the donor-ECU comprises the Human-machine-Interface/Multi-media (HMI/MM) processor, and one donor-ECU comprises the real-time processor. The definition of a breakdown is proposed to be basically radical, targeting to replace a processor or a whole storage subsystem, and excluding minor error correction scenarios. Advantageously, in an implementation other than an integrated ASIC, the multiplexing necessary for accessing the "slot-out" storage area is done by a FET-switch known per se from high bandwidth channel switching in networks.

In regard of the fact that a prior art ECU is typically built by a single device packed in a single housing it should be noted that the present invention provides improvements for multiply cooperating processing systems regardless of being realized in a single housing, ie a "single ECU design", or being realized in a multi-ECU approach by means of being implemented in multiple housings.

Thus, the above mentioned objective of the invention is achieved by the features stated in enclosed independent claims. Further advantageous arrangements and embodiments of the invention are set forth in the respective subclaims. Reference should now be made to the appended claims.

According to its broadest aspect the present invention discloses a method for operating an embedded system covering a plurality of technical applications, the operative functions of which are performed with a respective plurality of application-specific Electronic Control Units (ECU), whereby each ECU has separate need of resources regarding at least processing and storage subsystem, whereby the method is characterized by the steps of:

a) operating a preselected one of said ECUs as a "donor" ECU with a storage subsystem being increased for some predetermined degree, e.g. 110% of normally existent storage, i.e., 10% increase or more, b) reserving for at least one of said ECUs a predetermined storage area in the storage subsystem primarily associated with a preselected donor ECU of said plurality of ECUs, having a remarkable higher storage subsystem need and resources than the rest of ECUs, c) providing to each non-donor ECU an access to said reserved storage area, d) monitoring the operation of said ECUs, in case of breakdown of a non-donor ECU storage subsystem:

e) transforming addresses associated with said reserved storage area to new addresses adapted for being accessible by said breakdown ECU, where the transforming step is done in context with a memory access by a non-donor ECU, e.g. a real-time ECU being provided with access facilities to only a smaller address room compared to a multimedia ECU, f) assigning access to said non-donor ECU to a respective one of said reserved storage areas by using said transformed addresses.

The above transforming step e) is referred to also as slot-down memory access, as the reserved memory is mirrored down by preferably taking the complement of the reserved area storage address, in order to reserve the most important sections of the reserved area for the boot sector and operating system at maximum high addresses while concurrently processing them bottom-most according to the usual top/down memory structure.

The above step f) multiplexes between a single storage and two (or more) different processors further referred to herein as non-donor CPU(1) and donor CPU(2). The multiplexing is done in a preferred way by fast prior art FET switches detailed further below:

Further, in case of breakdown of a non-donor ECU processor it is proposed to perform the step of operating said donor-ECU in a shared-processor mode, in which a predetermined controllable extent of donor-ECU processor resources is used to run applications, which have run at the breakdown ECU before its breakdown. In this situation a single donor-CPU(2) is used for accessing its own donor memory subsystem and the one or more non-donor memory subsystems. Thus, also in this case, a respective multiplexing is performed as mentioned above, but the address transforming step is not necessary, as said donor-CPU runs with the respective original addresses of either respective memory subsystem.

Thus, it is proposed to operate a plurality of said ECUs in a combined way in which the workload of non-donor ECUs is shifted to said donor ECU. The advantage results that in case of above breakdown situations of non-donor ECU, this ECU's job will be continued by the donor ECU. If the donor ECU is provides a sufficient performance and its original tasks are less important than that one of the non-donor ECU, the inventional approach takes profit from this particular situation and provides for continued operation in error conditions accompanied by a tolerable, minor, i.e. "graceful" degradation of functionality, for example a slower refresh rate in a video display, or the like.

When the donor-ECU is a Human-Machine Interface Multimedia unit (HMI/MM), and a non-donor ECU is a real-time ECU having a considerable lower storage need than the donor ECU, the present invention exactly covers the current and maybe future situations of the automotive embedded systems and helps to improve such systems in the above-mentioned sense while avoiding higher costs due to saved redundant devices.

Further, when a breakdown is defined already by minor errors, limited to a non-successful operation of a subtotal of applications running in an ECU, then the advantage results that error handling is easier even in complex systems, as the permanently existing cross-relationships between the error statuses of two or more applications running in the same embedded system on the same ECU need not explicitly be handled. Instead, the whole subsystem, e.g. memory or processor, or both, is/are excluded from operation. This helps to obtain increased robustness of ECU operation. When the breakdown ECU functionality is further monitored and the breakdown status has disappeared, the normal way of operation may be retrieved.

Advantageously, the procedure of reserving said storage area is performed by hardware means, or in combination with processor-specific memory management means, operation system specific means, or middleware-specific means, as it is absolutely required that the reserved area is not used by any other application.

When the autonomic system controller 60 determines that a component is not more in error status, and works fine again, then the inventive system switches back to the normal operation mode after having performed a check of the former breakdown unit.

When the non-donor ECU performs permanently write and read access to both, its own storage subsystem and the reserved area in the donor-ECU subsystem, a permanent split-cycle operation mode can be run, which enables for nearly interruption-free operation in case the non-donor storage subsystem falls in the breakdown status. In this case, an error can also be defined when a compare on a read access from both memories yields different data. Further, instead of defining a radical breakdown it may be advantageous to first perform checksum analysis, prior art error analysis and acting according to their results.

The embedded system according to the invention may include multiplexer means for assigning access to said non-donor ECU to a respective one of said reserved storage areas, wherein the multiplexer means is implemented as a FET switch array. By that, multiplexing between two different processor devices does not add significant processing delay time to the system processing performance.

The embedded system may comprise an autonomic system control logic, which contains the major portion of error handling intelligence, and controls the before-mentioned DSSM chip according to its logic. Said autonomic system control logic is advantageously implemented in a programmable ASIC.

BRIEF DESCRIPTION OF THE DRAWINGS

The present invention is illustrated by way of example and is not limited by the shape of the figures of the schematical drawings in which the schematic representation of:

FIG. 4 illustrates a DSSM CPU/storage address layout example;

DETAILED DESCRIPTION OF THE PREFERRED EMBODIMENT

Figure 3:
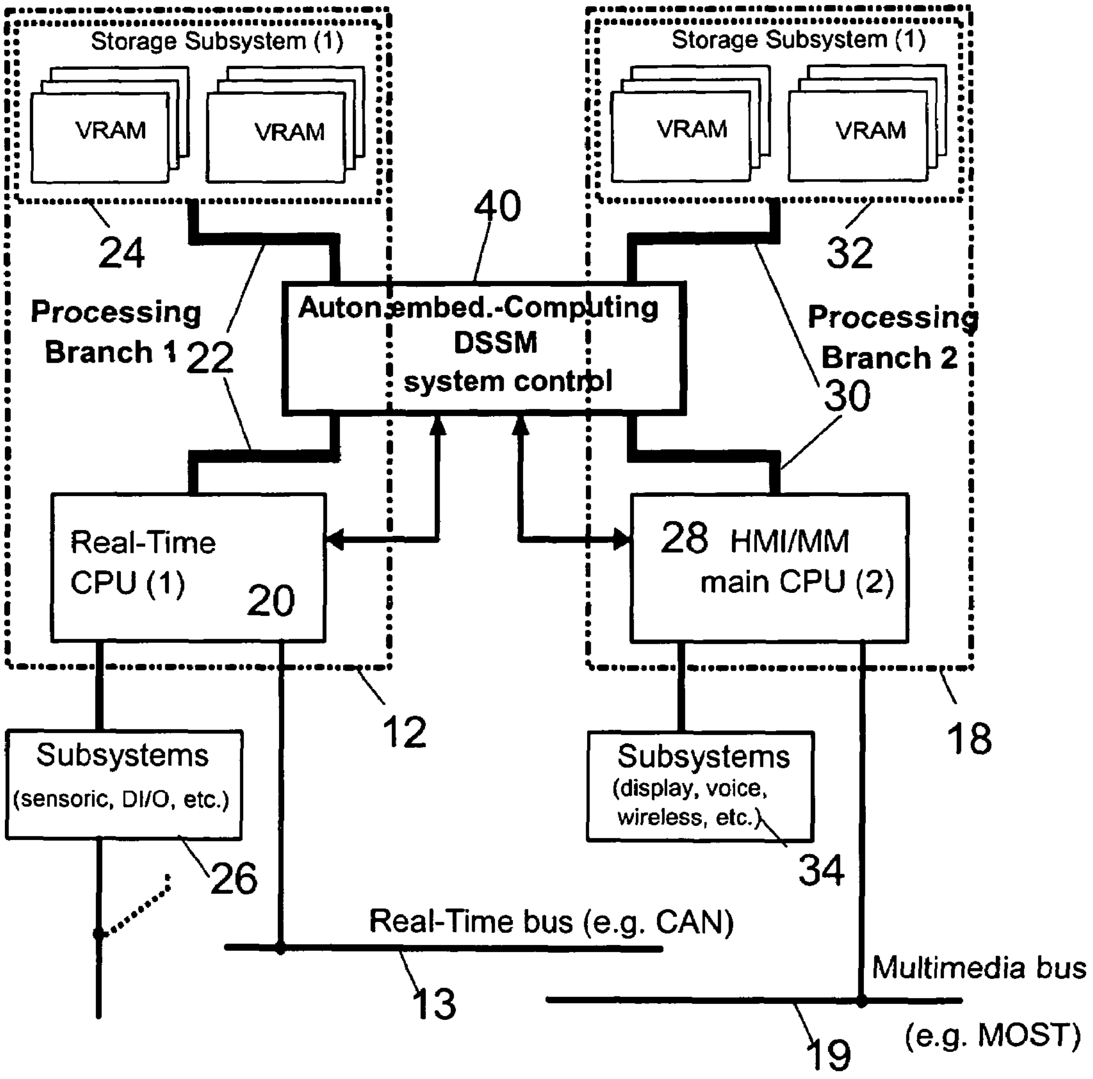
FIG. 3 illustrates the basic inventive approach in a system according to FIG. 2 and avoiding a redundantly provided shadow system.

With general reference to the figures and with special reference now to FIG. 3 a preferred implementation of the before-mentioned automotive telematics unit is described in more detail as a specific embodiment of the present invention, in which the donor-ECU is the multimedia ECU 18, and only one single non-donor-ECU is applied, i.e. a real-time ECU 12. It should be noted, however, that this embodiment can be easily extended to comprise more than one real-time ECU and may modified broadly without departing from the very scope of the invention, eg by providing also some donor functionality or attributes within the real- time ECU 12. The limitation is thus simply caused for sake of increased clarity of the core ideas of the present invention.

As reveals from FIG. 3, according to this specific, inventive embodiment a circuit 40 is provided which replaces. the system fault handler 36 provided in prior art, i.e. which incorporates the basic logic of it and, additionally includes most of the inventive features. Details of the circuit 40 are described in more detail with reference to FIG. 6 later below.

With first reference to FIG. 4 an inventional DSSM CPU/storage address layout example is described which serves to illustrate the way, in which addresses from the donor-ECU originating from a higher address range are transformed to a addresses of lower range, in order to be able to be accessed by the non-donor-ECU, i.e. the real-time ECU 12, which processes a smaller address range due to its reduced storage area compared to the donor-storage area from multimedia ECU 18.

In FIG. 4, the two most left columns indicate, that an address room of multimedia ECU 18 may be constructed by an address room of 24 bit, which corresponds to 16, 7 million storage locations, which may be accessed via a 24 bit wide address bus. Of course, the storage of said multimedia ECU 18 further comprises respective control lines required to perform a read or write access to the storage. The second column corresponds to a respective power of 2, depicted in the most left column. The third column shows that address lines 21 and 22 are forced according to a preferred feature of the present invention to "0", in order to reserve storage area for the processing branch of the real-time ECU 12, in case its storage resources fall in a breakdown status. Thus, a storage "slot" is excluded from original usage by the multimedia ECU 18. The excluded area may be dimensioned as the normally used memory subsystem of said non-donor ECU 12, e.g. 512 kByte in relation to 4 Mbyte address room of the donor ECU 18. It should be stressed that the inventive approach is explicitly covering future storage dimensions of e.g. 4 Mbyte for real-time ECUs and 512 Mbyte for Multimedia ECU 18.

Figure 5:
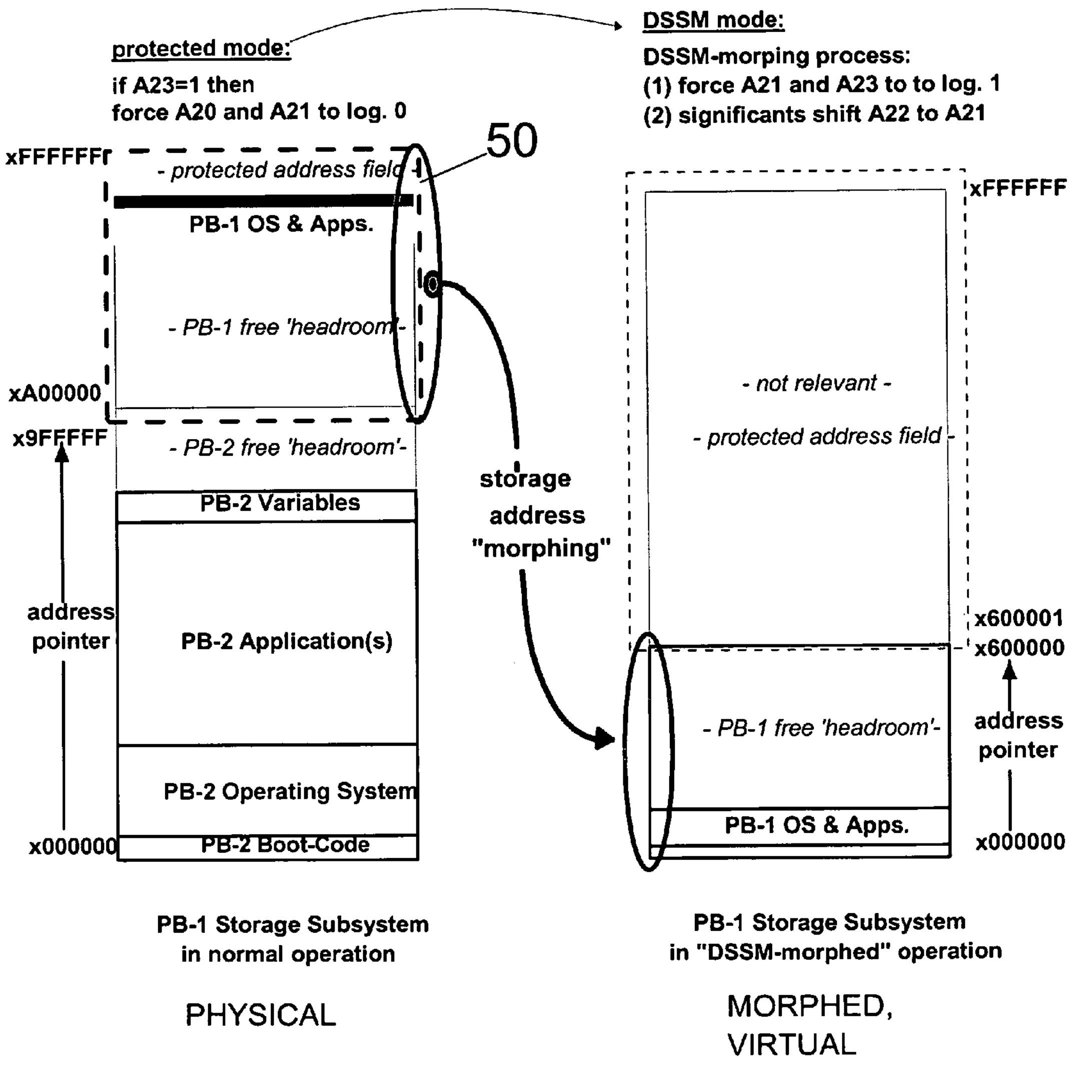
FIG. 5 illustrates an inventive procedure of DSSM storage subsystem "morphing"

With further reference to FIG. 5 the multimedia ECU 18 storage is depicted in the left portion of the figure and the "virtual" storage area used by the real-time ECU 12 storage subsystem is depicted in the right-hand portion of FIG. 5. The term "virtual" is used in order to express that in case of a breakdown of the original real-time ECU storage subsystem 24, the physical storage area of the multimedia ECU storage system depicted at the left side of FIG. 5 is used, but in a way of operation, which is basically transparent to the real-time processor 20.

In more detail, in the bottom most section of the multimedia storage subsystem area, depicted at the left side, the boot code is stored, in the next section the operating system is stored, in the next section above the address room being available for all multimedia applications is stored, followed by some smaller area dedicated for the runtime variables of the underlying multimedia applications, which is followed by a free, so-called "headroom" which is used for temporary usage of the multimedia ECU 18. This basic bottom-up structure is coincident with prior art storage use.

According to a basic feature of the present invention, however, a reserved storage area is provided for operation of the applications run by the real-time CPU 12, which is depicted with reference sign 50, which is depicted as a shaded area in the top most portion of the multimedia storage subsystem 32 this reserved storage area 50 is delimited by the hex-addresses xA00000 and by xFFFFF. The reserved area corresponds to the area being indicated by the lines 21 and 22 in FIG. 4. Thus, in this example a reserved area of U.S. Pat. No. 6,291,456 addresses are reserved for the operation of the real-time ECU.

According to a basic feature of the present invention this reserved area remains unused during normal operation of both ECUs. In case of storage subsystem breakdown of the real-time ECU 12, however, this ECU will be rebooted with the address room reserved for it in the storage of the multimedia ECU 18. According to a preferred aspect of the present invention this occurs in the so-called DSSM—Dynamic Storage Subsystem Morphing—mode, which performs a morphing or "slot-down/up" process: in this process the bits A21 and A23 are forced to the logical "1" value, which tears down any obstacles for writing into or reading from the reserved area. Further, the DSSM circuit will multiplex the original bits A22 to the place of A21 thus shifting the significant value to 2power21 what in a practical explanation will adjust the address max. to Hex 600000.

In the simplest implementation, the processing branch 1 (PB1) code including the associated applications will start from the 'lower address' leading to the higher addresses, as the PB2 physical layout shows in FIG. 5—see its left portion marked by "PHYSICAL". However, depending on the processor in use it may also be useful to boot from maximum address in top-down direction—beginning at address xFFFFFF as shown in the FIG. 5 PHYSICAL example.

In this preferred storage address "morphing" process the addresses are transformed in their complements in order to invert the sequence, in which the information is stored, because it is intended to store the most important information in the very top portion of the multimedia ECU storage subsystem, i.e. the storage reserved for the operating system for the real-time processor 20, and in order to guaranty, that the usual storage operation may be continued in the breakdown situation for the real-time ECU. Thus, by the before-mentioned steps of forcing bits A21 and A23 to logical "1" and by shifting the significant bits and by complementing them, the inventionally provided DSSM mechanism may be controlled to redirect any memory access from the breakdown subsystem storage to the well-working storage of the multimedia ECU 18. Thus, after a reboot of the real-time processor 20 the real-time applications may continue using the storage area "donated" by the donor ECU 18. It should be noted that the storage area of the donor ECU 18 should be dimensioned large enough in order to be able to provide this donating (donor) function.

Figure 1:
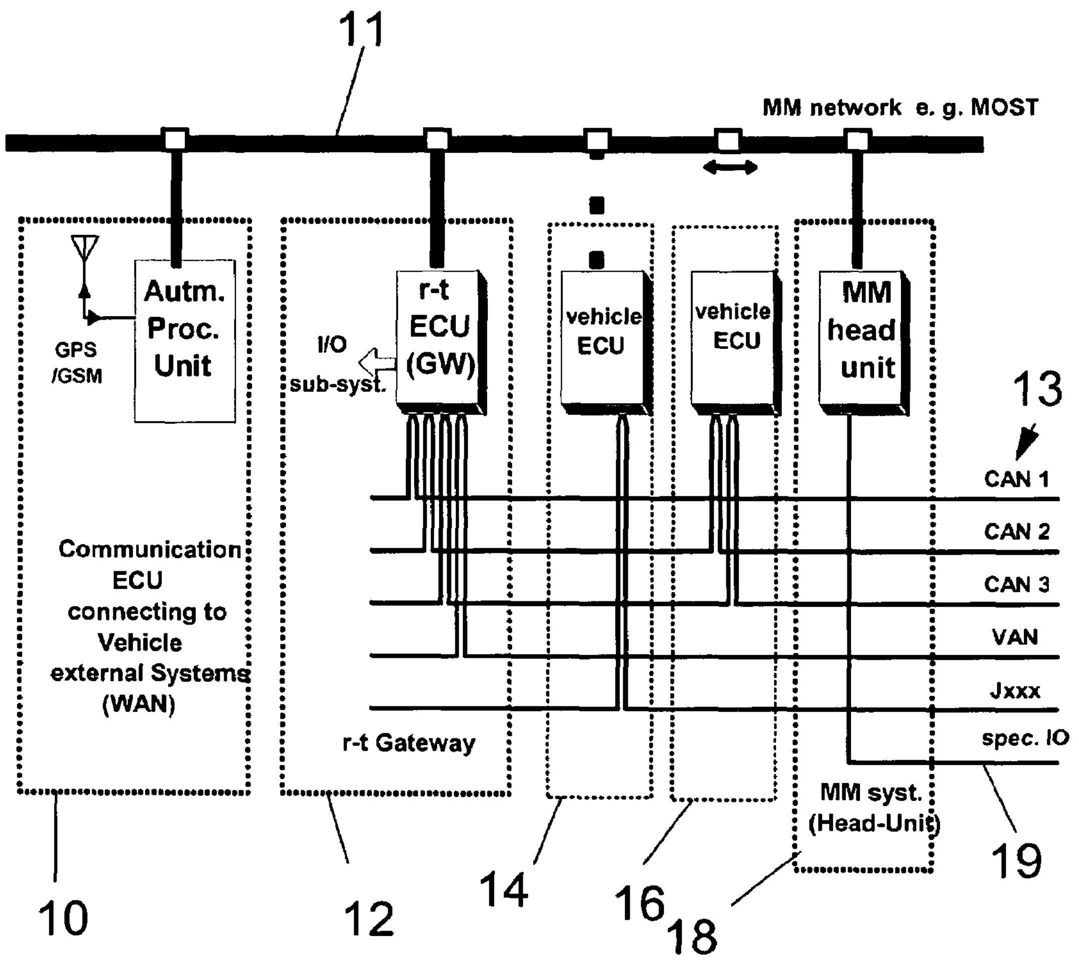
FIG. 1 illustrates the different, basic types of ECUs present in a prior art "networked" vehicle.
Figure 2:
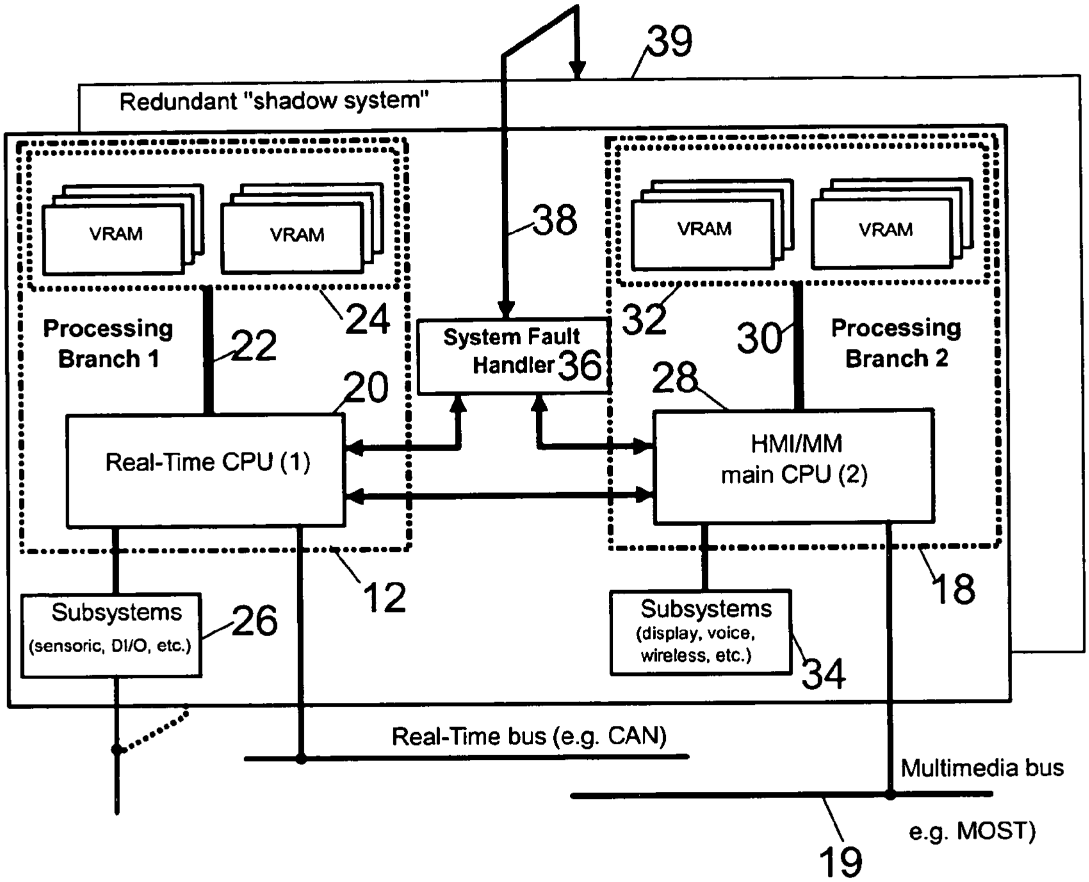
FIG. 2 illustrates the basic components and functionality of a prior art fault tolerant "automotive telematics ECU" by providing a respective redundant shadow system.
Figure 6:
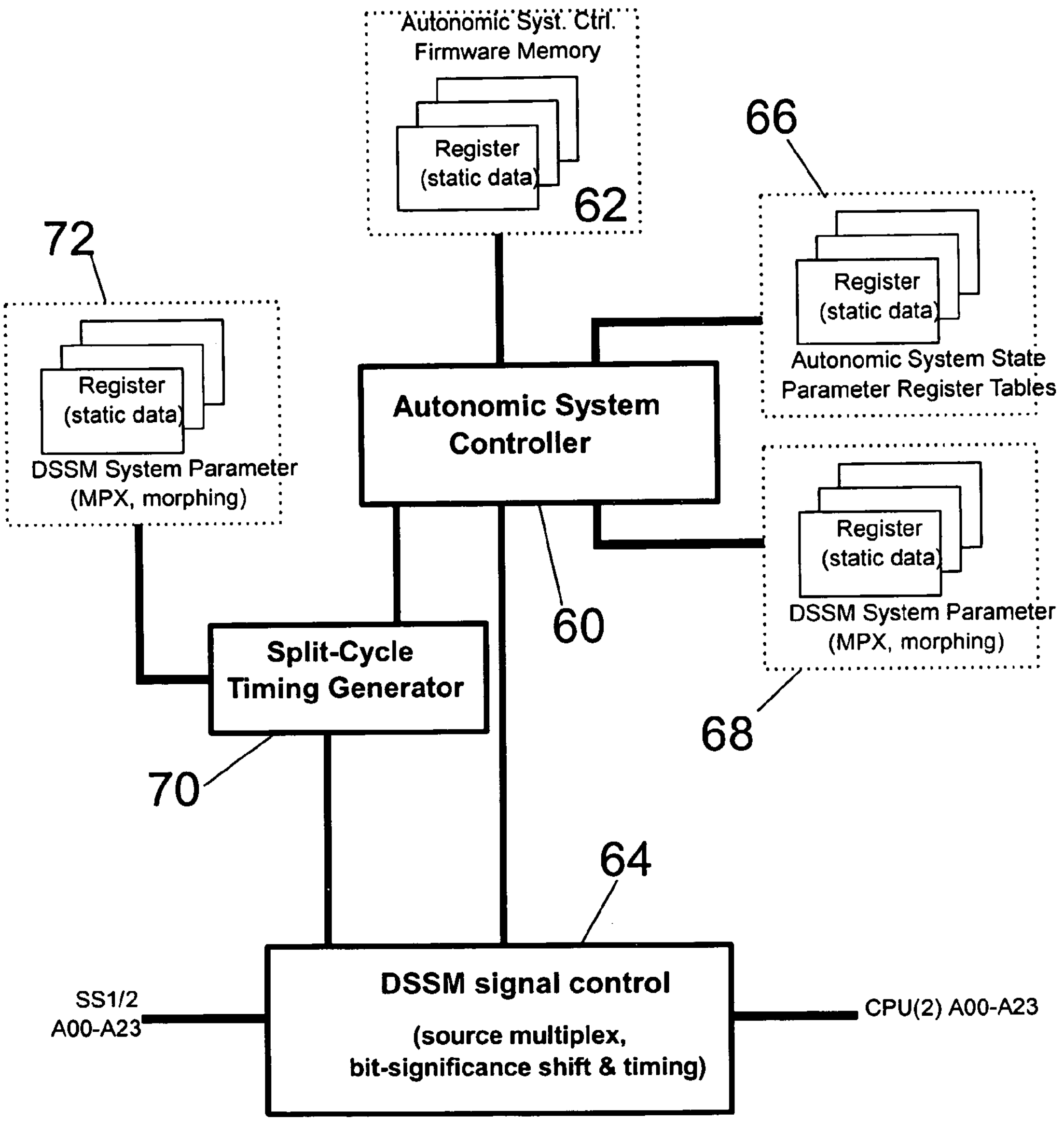
FIG. 6 illustrates the basic structure and functionality of autonomic system control and DSSM signal morphing (slot down/slot up) according to a preferred embodiment of the invention.

With further reference to FIG. 6 the basic structure and function of block 40 depicted in FIG. 3 will be described in more detail next below. An autonomic system controller 60 comprises any logic required for handling system faults, as this is done in prior art, see back to FIG. 2 system fault handler 36. It is connected to a set 62 of registers storing static data used by the firmware which implements the control logic. Controller 60 is further connected to a set 66 of registers, which store a plurality of relevant state parameters in respective register tables, said parameter describing the actual and the desired system state, i.e., error states, etc. Said autonomic system controller 60 is further connected to a register set 68, which stores static data required to operate the inventive DSSM mechanism. Thus, all parameters describing the DSSM circuit 64 (described further below), the multiplexing of storage accesses and the inventionally provided address morphing mechanisms are stored therein.

The autonomic system controller 60 is further connected to a DSSM signal control circuit 64, which realises the doing of the control logic provided in above-mentioned autonomic system controller 60. In particular, the tasks of source multiplexing and the before-mentioned shifting of bits are performed herein.

Further, according to a particular, advantageous feature of the present invention said autonomic system controller 60 is also connected to a split-cycle timing generator 70. Said generator 70 is connected to a set 72 of registers storing static data required for operating with the DSSM signal control circuit 64 during its tasks of multiplexing and storage address morphing.

Further, said split-cycle timing generator 70 is connected to the before-mentioned DSSM signal control circuit 64 in order to control a shared access to the donor ECU memory subsystem by both processors 20 and 28, when said real-time storage subsystem has a breakdown. Details of the split-cycle mode and the respective timing are described later with reference to FIG. 8.

Figure 7:
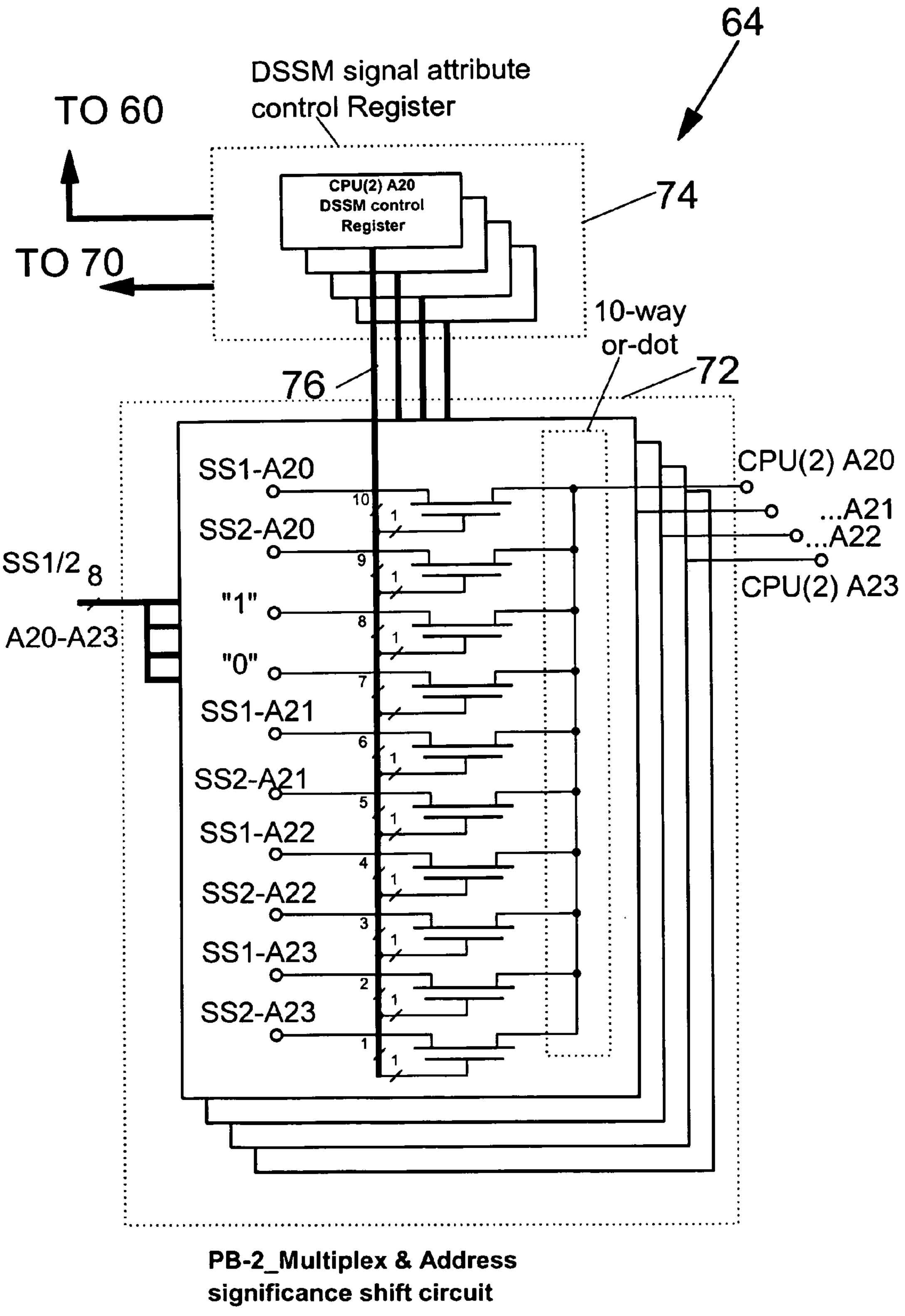
FIG. 7 illustrates some more details of the DSSM signal morphing of FIG. 6.

With further reference to FIG. 7 further details are given specifying the operation of the DSSM signal control circuit 64 in FIG. 6. A multiplex and address significance shift circuit 72 is provided, which is connected to a set 74 of DSSM signal attribute control registers, which store any signal attributes required to multiplex incoming addresses A20-A23 to the bit-shifted addresses A20-A23 at the right hand margin of the figure. Control lines 76 are provided to control forced ON/OFF of the signal lines depicted in a multiplexer circuit, of which a preferred implementation, a FET multiplexer so-called force on/off "morphing" array, is described with greater detail with reference to FIG. 9 later below.

The left-side input lines denoted by SS1-A20, . . . SS2-A23 are address lines controlled by a respective CPU(1) or (2) representing addresses A20 to A23 of either of said CPUs, CPU(1) or CPU(2).

The output lines at the right bottom of the figure are addresses lines connecting to Addresses A20 to A23 of the storage subsystem 2 (SS2).

According to the invention the addresses A20 to A23 can be fed via the control lines 76 from either of both CPUs to the storage subsystem 2. This is controlled by defining the address either a morphed (slot down) or unmorphed (slot up) form. For example, address line A0 of storage subsystem 2 can be connected to A20, A21, A22 or A23 of either CPU(1) or CPU(2) by either forcing the line to "0" or 1", respectively. This way any slot up or slot down process can be controlled according to the invention.

Figure 8:
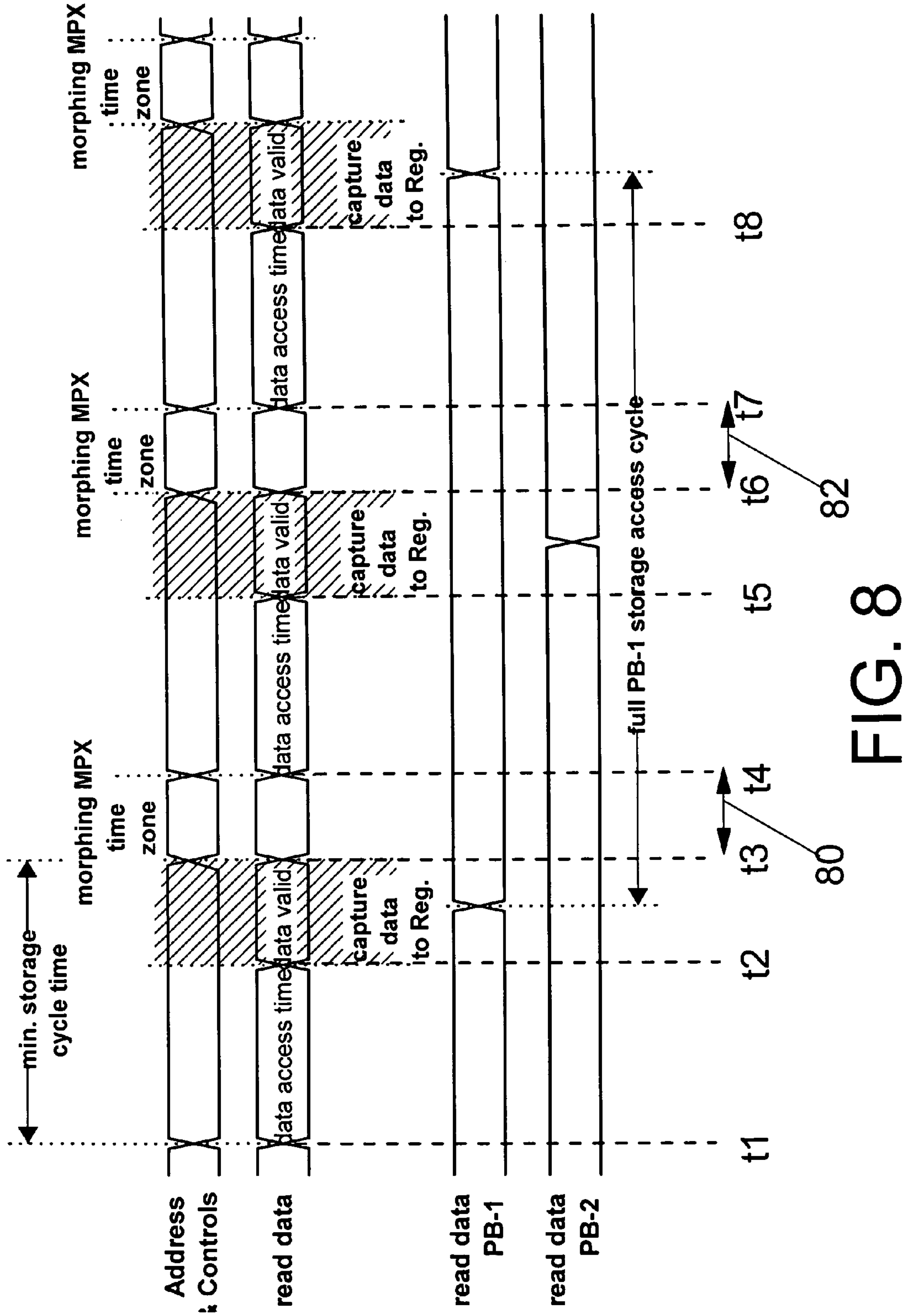
FIG. 8 illustrates in a time line increasing from left to right a DSSM "split-cycle-mode" for accessing the storage according to a preferred embodiment of the present invention.

With further reference to FIG. 8 details on the inventional DSSM split-cycle mode storage access are given next below. Both processing branches—PB1 of real-time processor 20, CPU(1) and PB2 of Multimedia processor 28, CPU(2), access the same memory subsystem 32, i.e. that of the donor ECU.

The first line showing crossing signal lines is given just to indicate that the timing scheme is valid independent of the actually present bit status of either, address lines or control lines.

Between time t1 and t2 a data access time is shown belonging to a preceding data access, not relevant by which processor—assume done by the real-time processor 20 for branch PB1—addressing the protected high address range 50, refer back to FIG. 5, with "virtual addresses" generated by the morphing process and slotting down into a "logical" lower address range accessible by the real-time processor.

During that time the data arrives at the respective read output ports of memory 32. Between t2 and t3 all of said data is definitely valid and may be captured into a respective register. This reflects usual prior art memory access technology.

According to a preferred aspect of the present invention, during t3 and t4 a predetermined time zone 80 is provided, in which the above described address transforming process and multiplex/switching process may take place, in order to switch the read access circuitry to enable access by the multimedia processor 28, ie for running a read access for processing branch 22, PB1. Thus, in time zone 80 new addresses are generated and the circuit is switched for preparing the read access for PB2.

Then the same read cycle is run for the processing branch PB2 of the multimedia processor 28. Thus, between t4 and t5 the new PB2 data arrives at the read output ports, from which it may be captured into specific PB2 read registers after it is valid between time t5 and t6.

Then a new read access for the real-time processor is assumed to be desired. In order to do that the address morphing done during time zone 80 must be inversed again. This is done in time zone 82 by inverting the morphing procedure as described above. Thus, a slot-down procedure is done, and the multiplexer is switched back in favour to PB1, in order to prepare the memory addressing circuitry for a read access ready for the real-time CPU(1), which may then start after t7. Then the same read cycle is repeated as it was described before.

The write access can be handled according to the same scheme.

Figure 9:
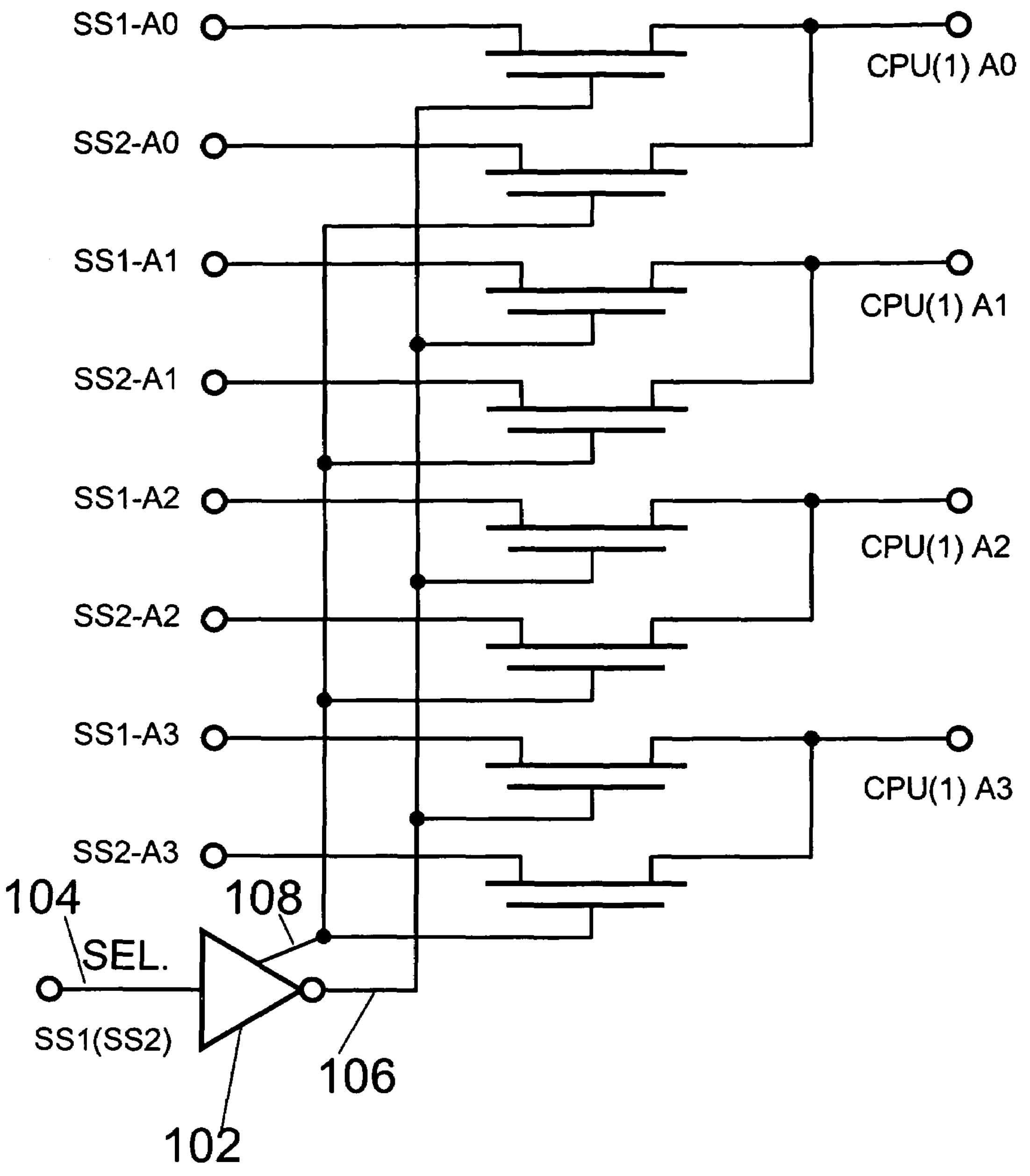
FIG. 9 illustrates a minimum delay address multiplexer implementation, when a FET-switch is used.

With further reference to FIG. 9 an advantageous multiplexer implementation—nearly zero-time-delay address multiplexer—is illustrated by way of example and restricted to a small number of address lines for sake of clarity. Thus, only a small section of the whole multiplexer unit, which is advantageously implemented as a Field-Effect-Transistor (FET) switch in array form, is depicted in FIG. 9.

FIG. 9 illustrates an example allowing the CPU(1) to access either SS1 or SS2.

An input switch 102 has a control select input signal denoted as SS1, or SS2, respectively. SS1 is assumed to correspond to value "high" and SS2 is assumed to represent "low". The switch has two output lines 106, 108 respectively, of which 106 is inverted. A number of 8 transistors are provided, which switch through either the signal incoming at SS1-A0 input line, or SS2-A0 input line for an address line A0 dedicated to real-time processor 20.

Figure 10:
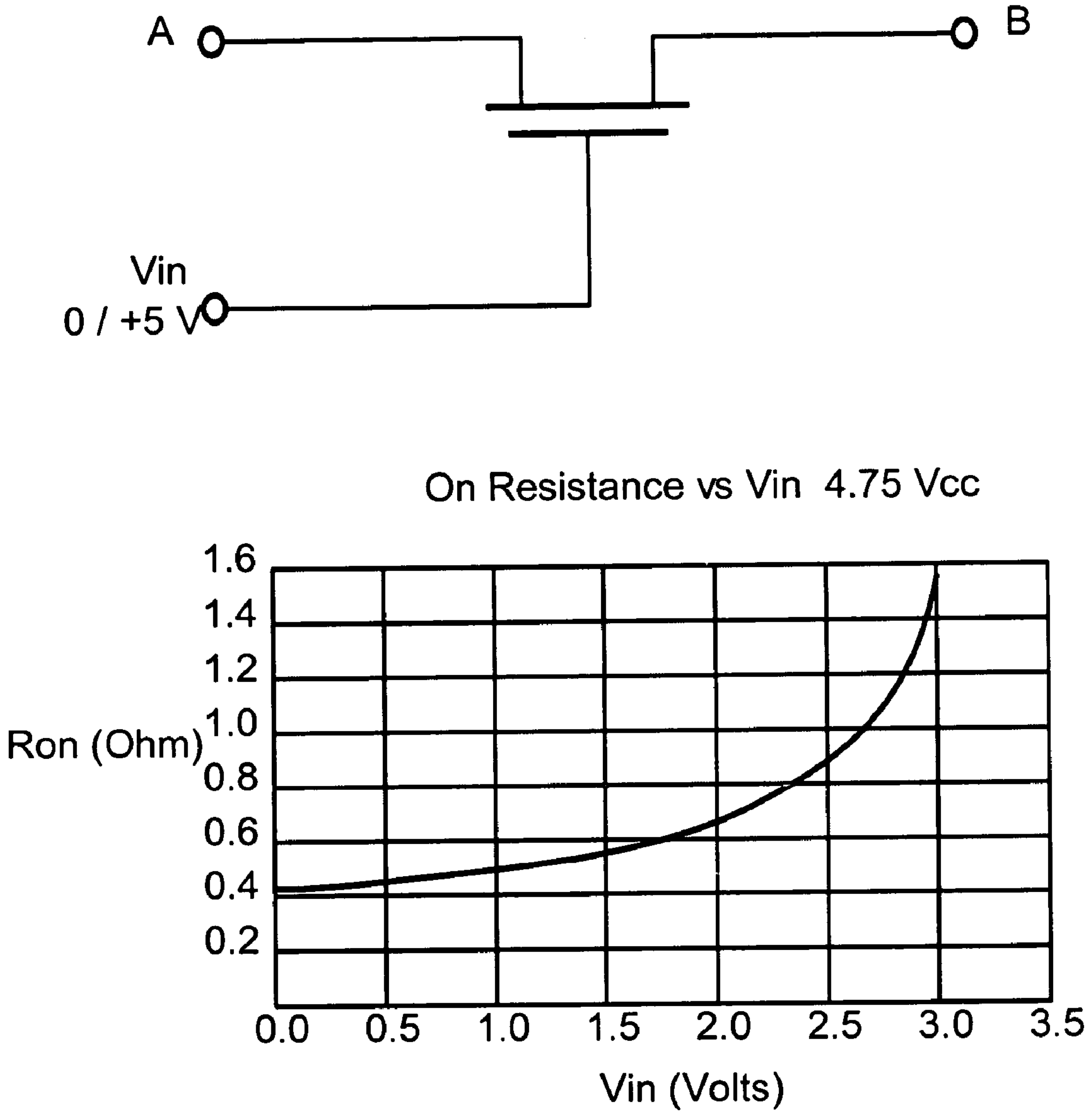
FIG. 10 illustrates the N-channel, MOS-transistor, CMOS-gate characteristics applied in a FET-switch used in FIG. 9.

The control is done via the select line 104. In case a low value is present at line 104, output line 108 is also low and output line 106 is high. Thus, when an N-channel MOS-transistor in CMOS-type is implemented, having the gate characteristics as it is depicted in FIG. 10, the address line SS2-A0 would be switched through to the output for real-time processor 20, depicted in the drawing as CPU(1). Otherwise, the input line SS1-A0 would be switched through. The same is done for all address lines and the rest of control lines for addressing the total of address and control lines required for operating the real-time processor in case of storage subsystem breakdown.

With additional reference to FIG. 10 the before-mentioned CMOS-gate characteristics are illustrated, which are applied in the before-mentioned nearly zero-time-delay address multiplexer example given in FIG. 9. As the ON-resistance corresponding to an input voltage at the gate of 0 Volt produces the conducting state having very low resistance of less than 1 Ohm, and given an input capacity of an address line into the memory subsystem of about 5 to 10 Picofarad, a very low R/C switching time delay results in the range of a couple of Picoseconds or even Femtoseconds. Thus, applying those FET switches is advantageous for maintaining the split cycle mode depicted in FIG. 8.

In the specific telematics example given above the described operation method is extremely adapted to the situation in high end automotive embedded systems. In this case the real-time processor 20 does not need a large memory, but instead it should be able to handle interrupts quite fast in order to process the sensed real-time data. The multimedia processor 18, however, is very well adapted to take over the role of a donor-ECU as it is per se provided with a large memory and with a high performing processor. In situations, in which the characteristics are not thus significantly different, the inventive method can be adapted by reserving a relatively large storage area to a reduced number of non-donor as well as to donor ECUs.

The present invention can be realized in hardware, or a combination of hardware and software, for example in a programmable ASIC form or with selected units being implemented in any type of hardware implementation as required by the applicational use of the embedded system.

A variety of modifications and adaptations are feasible to reflect and adapt to respective applicational uses: It should be noted for example that the number of non-donor ECUs can also be greater than one, which is thus different to the before-described preferred embodiment. In this case, a respective larger plurality of reserved storage areas is provided in the donor ECU storage subsystem. Further, it will be appreciated by a person skilled in the art that the split-cycle operation mode, which was discussed earlier, is then modified accordingly. For example, given a case, in which a number of four non-donor ECUs are present, a solution is to apply the same split-cycle scheme in a first cycle for the first non-donor ECU, in a later cycle for a second non-donor ECU, in a third later cycle for a third non-donor ECU, etc. Alternatively, the storage area morphed according to the present invention for being accessed by the non-donor ECUs can also be applied according to access rules, which implement a certain priority sequence. In this way it is possible to handle the most important functions with a higher priority compared to less important functions. This might be of increased importance in case of X-by wire scenarios, in which any functionality, like steering or actuating the break of a vehicle is performed without any mechanical transformation chain, but solely computer calculated and actuated by a motor driven by respective computer-generated control signals.

Further, the error status definition may vary according to the actual application for which the embedded system is used. In cases, in which error handling is less complex, it may be advantageous to render the error management less radical.

The invention claimed is:

1. A method for operating an embedded system covering a plurality of technical applications, the operative functions of which are performed with a respective plurality of application-specific Electronic Control Units (ECUs), wherein each ECU having separate need of resources regarding at least processing and storage subsystems, the method characterized by the steps of:

a) operating a preselected one of said ECUs as a "donor" ECU being provided with predefined storage subsystem resources; and b) in case of a breakdown of either a storage subsystem or processing subsystem of a "non-donor" ECU donating respective predefined resources corresponding to either a broken down storage subsystem or a broken down processing subsystem from said "donor" ECU to said "non-donor" ECU wherein either an unbroken down storage subsystem or an unbroken down processing subsystem remains, and wherein the "non-donor" ECU retains the corresponding unbroken down processing subsystem or the corresponding unbroken down storage subsystem.

2. The method according to claim 1 further comprising the steps of:

a) operating a preselected one of said ECUs as a "donor" ECU with a storage subsystem being increased for some predetermined degree, b) reserving for at least one non-donor ECU of said ECUs a respective predetermined storage area in the storage subsystem primarily associated with said preselected donor ECU of said plurality of ECUs;

c) providing to each non-donor ECU an access to a respective one of said reserved storage areas;

d) monitoring the operation of said ECUs, in case of breakdown of a non-donor ECU storage subsystem breakdown;

e) transforming addresses associated with said reserved storage area to new addresses adapted for being accessible by said non-donor ECU; and f) assigning access to said non-donor ECU to a respective one of said reserved storage areas (50) by using said transformed new address.

3. The method according to claim 1, in which a split-cycle mode operation is performed in which in one memory operation cycle of the donor-ECU the donor ECU and one non-donor ECU access the same storage subsystem.

4. The method according to claim 1, further in case of breakdown of a non-donor ECU processor breakdown comprising the step of:

operating said donor ECU in a shared-processor mode, in which a predetermined controllable extent of donor-ECU processor resources is used to run applications, which have run at said non-donor ECU before its breakdown.

5. The method according to claim 1, in which the donor ECU is a human interface Multimedia unit, and a non-donor ECU is a real-time ECU having a considerable lower storage need than the donor ECU.

6. The method according to claim 1, in which a breakdown is defined by errors limitedly resulting in a non-successful operation of a subtotal of applications running in an ECU.

7. The method according to claim 2, comprising the step of reserving said storage area (SO) by hardware means, by processor-specific memory management means, operation system specific means, or middleware-specific means.

8. The method according to the preceding claim 3, in which write and read accesses are performed permanently to both, the respective own donor-ECU storage subsystem and to a respective reserved area in the donor-ECU subsystem, and said split-cycle operation mode is performed permanently.

9. The method according to claim 8, further comprising the steps of:

in a split cycle comparing read data of a non-donor ECU and respective redundant read data from said respective reserved storage area in said donor-ECU; and if read data is not identical, initiating predetermined error management.

10. An embedded system having means for performing the steps of a method according to any of claims 1 to 9, comprising a hardware logic circuit connectable between a donor ECU and a non-donor ECU said hardware logic circuit comprising logic means for implementing the donating functions.

11. An embedded system comprising a hardware logic circuit (40) connectable between a donor ECU and a non-donor ECU, said hardware logic circuit comprising logic means for implementing the donating functions, in which said hardware logic circuit comprises:

a) an autonomic system control means implementing system faults handling means operatively connected to b) a DSSM signal control circuit connected for implementing the multiplexing of storage accesses and the address transforming operations, and to c) a split-cycle timing generator connected for implementing a shared access to said donor ECU storage subsystem;

said system having means for performing the steps of a method covering a plurality of technical applications, the operative functions of which are performed with a respective plurality of application-specific Electronic Control Units (ECU), each ECU having separate need of resources regarding at least processing and storage subsystem, characterized by the steps of:

a) operating a preselected one of said ECUs as a "donor" ECU being provided with predefined storage subsystem resources; and b) in case of a breakdown of either a storage subsystem or processing subsystem of a "non-donor" ECU donating respective predefined resources corresponding to either a broken down storage subsystem or a broken down processing subsystem from said "donor" ECU to said "non-donor" ECU, wherein either an unbroken down storage subsystem or an unbroken down processing subsystem remains, and wherein the "non-donor" ECU retains the corresponding unbroken down processing subsystem or the corresponding unbroken down storage subsystem;

in which a split-cycle mode operation is performed in which in one memory operation cycle of the donor-ECU the donor ECU and one non-donor ECU access the same storage subsystem; and in which write and read accesses are performed permanently to both, the respective own donor-ECU storage subsystem and to a respective reserved area in the donor-ECU subsystem, and said split-cycle operation mode is performed permanently.

12. The embedded system according to claim 11 in which a multiplexer means is provided within said DSSM signal control circuit for assigning access to said non-donor ECU to a respective one of said reserved storage areas, which is implemented as a FET switch array.

13. The embedded system according to claim 12 in which said autonomic system control means is implemented in a programmable ASIC.

* * * * *